United States Patent
Archer et al.

(10) Patent No.: US 9,246,792 B2
(45) Date of Patent: *Jan. 26, 2016

(54) PROVIDING POINT TO POINT COMMUNICATIONS AMONG COMPUTE NODES IN A GLOBAL COMBINING NETWORK OF A PARALLEL COMPUTER

(75) Inventors: Charles J. Archer, Rochester, MN (US); Ahmad A. Faraj, Rochester, MN (US); Todd A. Inglett, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/440,252

(22) Filed: Apr. 5, 2012

(65) Prior Publication Data

US 2012/0189012 A1 Jul. 26, 2012

Related U.S. Application Data

(63) Continuation of application No. 12/176,840, filed on Jul. 21, 2008, now Pat. No. 8,194,678.

(51) Int. Cl.
*H04L 12/28* (2006.01)
*H04L 12/701* (2013.01)
*H04L 12/725* (2013.01)
*H04L 12/913* (2013.01)

(52) U.S. Cl.
CPC .............. *H04L 45/00* (2013.01); *H04L 45/30* (2013.01); *H04L 47/724* (2013.01)

(58) Field of Classification Search
CPC ....... H04L 45/54; H04L 45/302; H04L 45/00; G06F 15/17337
USPC ......................... 370/238, 392, 395.3, 395.32
See application file for complete search history.

(56) References Cited

U.S. PATENT DOCUMENTS 5,265,207 A  11/1993  Zak et al.
5,333,268 A  7/1994  Douglas et al.
(Continued)

OTHER PUBLICATIONS

Moreira et al., "The Blue Gene/L Supercomputer: A Hardware and Software Story", Intl Journal of Parallel Programming, vol. 35, No. 3, Jun. 2007 p. 181-206.*

(Continued)

*Primary Examiner* — Brian O'Connor
(74) *Attorney, Agent, or Firm* — Edward J. Lenart; Grant A. Johnson; Kennedy Lenart Spraggins LLP

(57) ABSTRACT

Methods, apparatus, and products are disclosed for providing point to point data communications among compute nodes in a global combining network of a parallel computer that include: determining a class route identifier available for all of the nodes along a communications path from an origin node to a target node; configuring network hardware of each node along the communications path with routing instructions in dependence upon the available class route identifier and the network's topology; transmitting, by the origin node along the communications path, a network packet to the target node, including encoding the available class route identifier in the network packet; and routing, by the network hardware of each node along the communications path, the network packet to the target node in dependence upon the routing instructions for each node and the available class route identifier.

18 Claims, 10 Drawing Sheets

(56) References Cited

U.S. PATENT DOCUMENTS

| | | | |
|---|---|---|---|
| 5,530,809 | A | 6/1996 | Douglas et al. |
| 5,666,361 | A | 9/1997 | Aznar et al. |
| 6,094,715 | A * | 7/2000 | Wilkinson et al. ............ 712/20 |
| 6,622,233 | B1 | 9/2003 | Gilson |
| 7,000,033 | B2 | 2/2006 | Lee |
| 7,007,189 | B2 | 2/2006 | Lee et al. |
| 7,051,185 | B2 | 5/2006 | Gilson |
| 7,099,341 | B2 | 8/2006 | Lingafelt et al. |
| 7,185,138 | B1 * | 2/2007 | Galicki ............ 710/316 |
| 7,483,998 | B2 | 1/2009 | Rabinovitch |
| 7,673,011 | B2 | 3/2010 | Archer et al. |
| 7,773,618 | B2 * | 8/2010 | Leonard et al. ............ 370/409 |
| 8,144,709 | B2 * | 3/2012 | Hazard ............ H04L 12/66 370/392 |
| 8,194,678 | B2 * | 6/2012 | Archer et al. ............ 370/395.3 |
| 8,345,548 | B2 * | 1/2013 | Gusat ............ H04L 45/00 370/230 |
| 8,902,892 | B2 * | 12/2014 | Hoenicke ............ H04L 45/00 370/392 |
| 2002/0049608 | A1 | 4/2002 | Hartsell et al. |
| 2003/0126289 | A1 | 7/2003 | Aggarwal et al. |
| 2003/0137978 | A1 * | 7/2003 | Kanetake ............ 370/386 |
| 2004/0078493 | A1 | 4/2004 | Blumrich et al. |
| 2005/0201356 | A1 * | 9/2005 | Miura et al. ............ 370/351 |
| 2006/0101158 | A1 | 5/2006 | Shand et al. |
| 2006/0227774 | A1 * | 10/2006 | Hoenicke ............ 370/389 |
| 2008/0084827 | A1 | 4/2008 | Archer et al. |
| 2008/0301704 | A1 | 12/2008 | Archer et al. |
| 2009/0037598 | A1 | 2/2009 | Archer et al. |
| 2009/0043912 | A1 | 2/2009 | Archer et al. |
| 2009/0043988 | A1 | 2/2009 | Archer et al. |
| 2009/0138892 | A1 | 5/2009 | Almasi et al. |
| 2010/0014523 | A1 | 1/2010 | Archer et al. |
| 2013/0176904 | A1 | 7/2013 | Archer et al. |

OTHER PUBLICATIONS

Faraj et al., "A Message Scheduling Scheme for All-to-All Personalized Communication on Ethernet Switched Clusters", IEEE Trans on Parallel and Distributed Systems, vol. 18, No. 2, Feb. 2007, p. 264-276.*

Final Office Action, U.S. Appl. No. 11/834,159, Mar. 29, 2012.

Rosen et al., "Multiprotocol Label Switching Architecture", Network Working Group Request for Comments (RFC 3031), Jan. 2001, pp. 1-78, IEFT.org (online publication), URL: http://www.ietf.org/rfc/rfc3031.txt.

Sedgewick, "Algorithms in C++ Part 5: Graph Algorithms, Third Edition", Addison-Wesley Professional, Dec. 2001, pp. 1-15, Pearson Education, Inc., USA.

Office Action, U.S. Appl. No. 11/832,955, Jun. 23, 2009, pp. 1-13.

Office Action, U.S. Appl. No. 11/832,955, Nov. 30, 2011, pp. 1-18.

Office Action, U.S. Appl. No. 12/176,840, Apr. 23, 2010, pp. 1-23.

Office Action, U.S. Appl. No. 12/176,840, Mar. 11, 2011, pp. 1-25.

* cited by examiner

PROVIDING POINT TO POINT COMMUNICATIONS AMONG COMPUTE NODES IN A GLOBAL COMBINING NETWORK OF A PARALLEL COMPUTER

CROSS-REFERENCE TO RELATED APPLICATION

This application is a continuation application of and claims priority from U.S. patent application Ser. No. 12/176,840, filed on Jul. 21, 2008.

BACKGROUND OF THE INVENTION

1. Field of the Invention

The field of the invention is data processing, or, more specifically, methods, apparatus, and products for providing point to point data communications among compute nodes in a global combining network of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. The drawback to current tree networks, however, is that such networks typically does not lend themselves to and are inefficient for point-to-point operations.

SUMMARY OF THE INVENTION

Methods, apparatus, and products are disclosed for providing point to point data communications among compute nodes in a global combining network of a parallel computer. Each compute node connected to each adjacent compute node in the global combining network through a network link. Providing point to point data communications among compute nodes in a global combining network of a parallel computer includes: determining, from among a plurality of class route identifiers for each of the compute nodes along a communications path from an origin compute node to a target compute node in the network, a class route identifier available for all of the compute nodes along the communications path; configuring network hardware of each compute node along the communications path with routing instructions in dependence upon the available class route identifier and a network topology for the network, the routing instructions for each compute node associating the available class route identifier with the network links between that compute node and each compute node adjacent to that compute node along the communications path; transmitting, by the origin compute node along the communications path, a network packet to the target compute node, including encoding the available class route identifier in the network packet; and routing, by the network hardware of each compute node along the communications path, the network packet to the target compute node in dependence upon the routing instructions for the network hardware of each compute node and the available class route identifier encoded in the network packet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
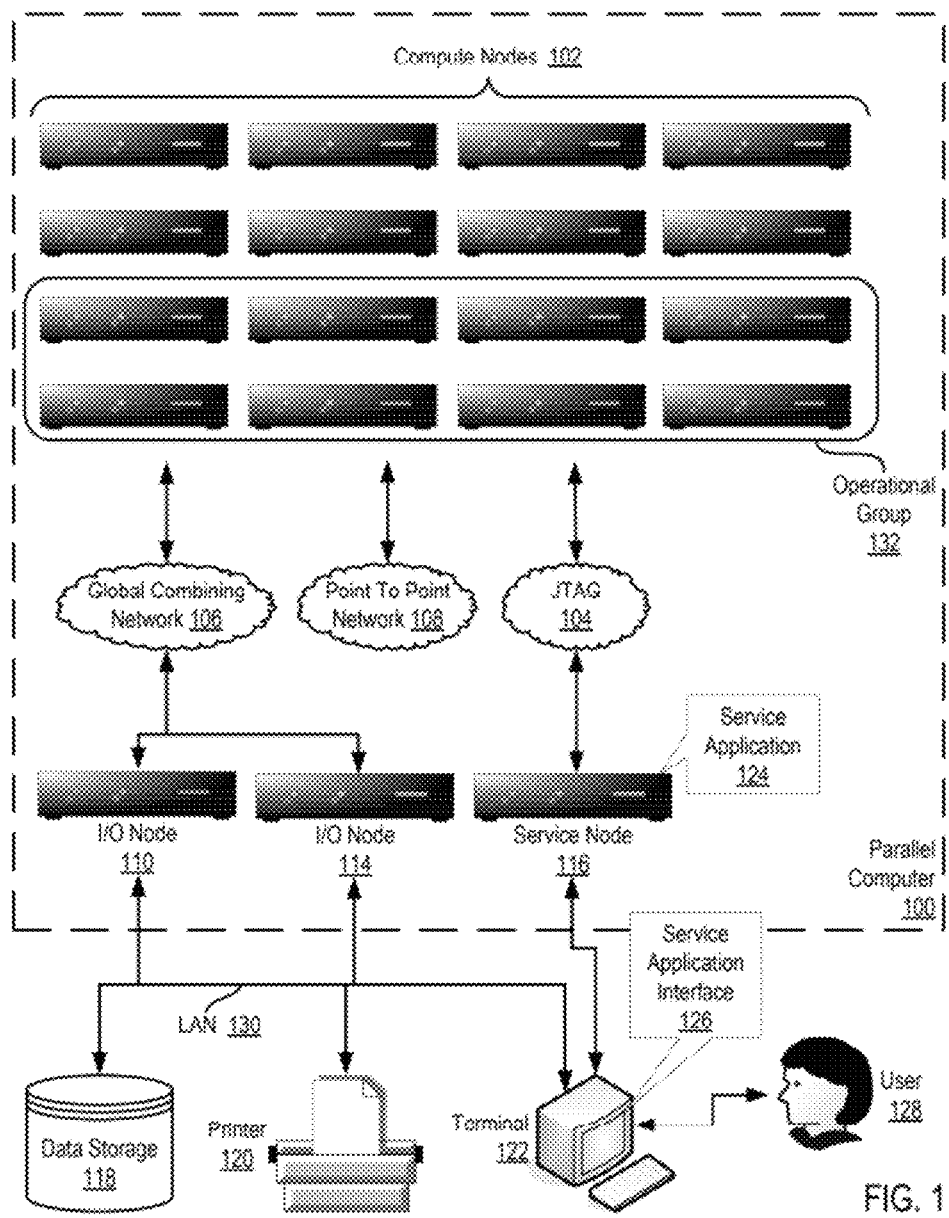
FIG. 1 illustrates an exemplary parallel computer for providing point to point data communications among compute nodes in a global combining network according to embodiments of the present invention.

Exemplary methods, apparatus, and computer program products for providing point to point data communications among compute nodes in a global combining network of a parallel computer according to embodiments of the present invention are described with reference to the accompanying drawings, beginning with FIG. 1. FIG. 1 illustrates an exemplary parallel computer for providing point to point data communications among compute nodes in a global combining network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) in FIG. 1 includes computer program instructions for providing point to point data communications among compute nodes (102) in a global combining network (106) of the parallel computer (100) according to embodiments of the present invention. Each compute node (102) of FIG. 1 is connected to each adjacent compute node in the global combining network (106) through a network link. The parallel computer (100) of FIG. 1 provides point to point data communications among compute nodes (102) in a global combining network (106) of the parallel computer (100) according to embodiments of the present invention as follows: The parallel computer (100) determines, from among a plurality of class route identifiers for each of the compute nodes along a communications path from an origin compute node to a target compute node in the network, a class route identifier available for all of the compute nodes along the communications path. The parallel computer (100) configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The origin compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. Readers will note that the origin compute node is a compute node attempting to transmit a network packet, while the target compute node is a compute node intended as the final recipient of the network packet.

A class route identifier is an identifier that specifies a set of routing instructions for use by a compute node in routing a particular network packet in the global combining network (106). Typically, when a compute node receives a network packet, the network hardware of the compute node identifies the class route identifier from the header of the packet and then routes the packet according to the routing instructions associated with that particular class route identifier. Using different class route identifiers, therefore, a compute node may route network packets using different sets of routing instructions. The number of class route identifiers that each compute node is capable of utilizing is finite and typically depends on the number of bits allocated for storing the class route identifier. An 'available' class route identifier is a class route identifier that is not actively utilized by the network hardware of a compute node to route network packets. For example, a compute node may be capable of utilizing sixteen class route identifiers labeled 0-15, but only actively utilize class route identifiers 0 or 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

The communications path along which the origin compute node communicates with the target compute node is a set of compute nodes and network links between those compute nodes that relay communications between the origin compute node and the target compute node. While the terminal nodes of the communications path are the origin compute node and the target compute node, the compute nodes along the communications path that relay communications between the origin compute node and the target compute node are referred to as 'intervening compute nodes.'

As mentioned above, routing of the network packet according to embodiments of the present invention is carried out by the network hardware of each compute node along the communications path. The network hardware of each compute node includes the node's network adapter or other specialized hardware that provides an interface for the network to the compute node's processors.

The arrangement of nodes, networks, and I/O devices making up the exemplary system illustrated in FIG. 1 are for explanation only, not for limitation of the present invention. Data processing systems capable of providing point to point data communications among compute nodes in a global combining network of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Providing point to point data communications among compute nodes in a global combining network of a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of providing point to point data communications among compute nodes in a global combining network according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
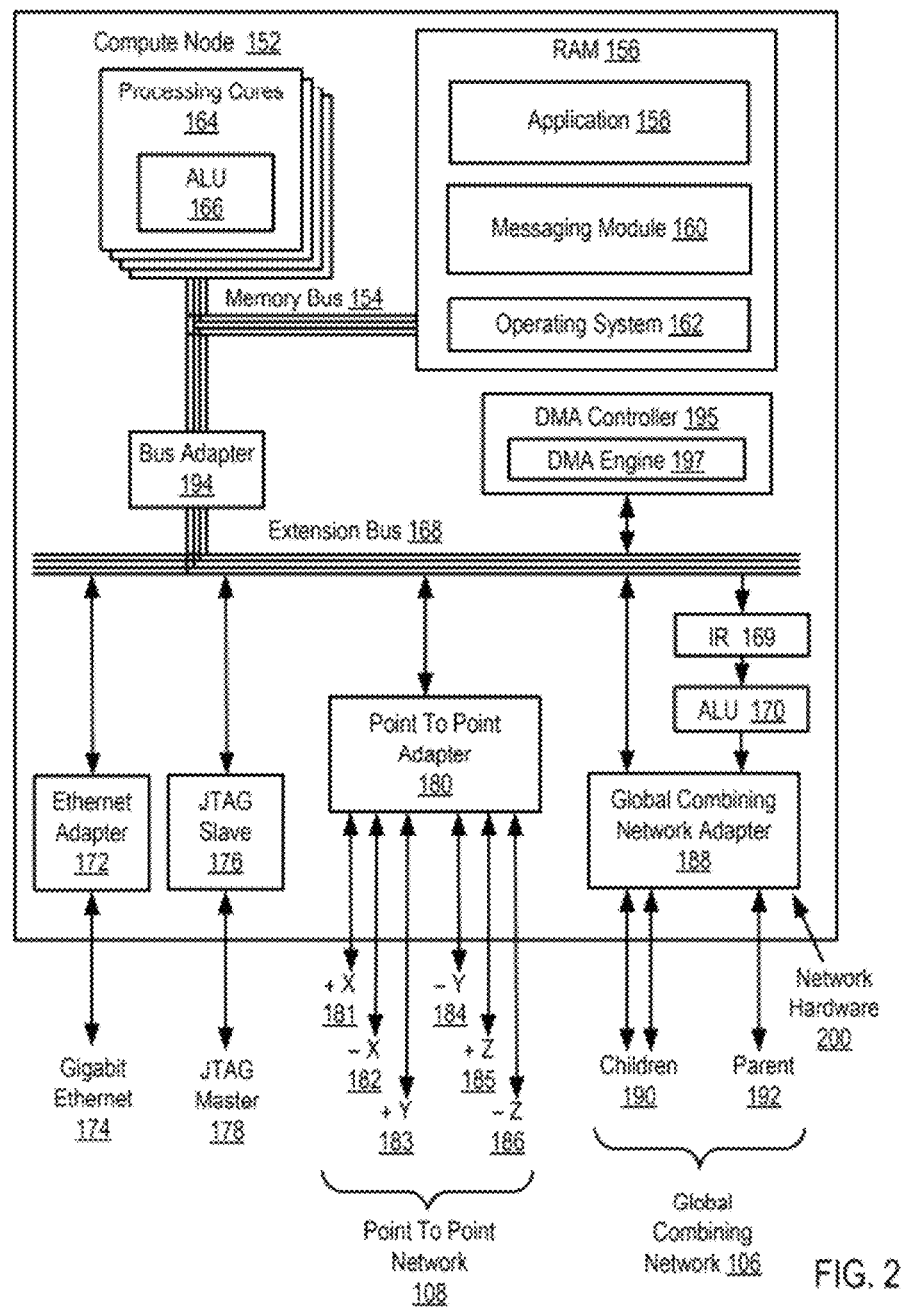
FIG. 2 sets forth a block diagram of an exemplary compute node useful in a parallel computer capable of providing point to point data communications among compute nodes in a global combining network according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network.

Examples of communications adapters useful in systems for providing point to point data communications among compute nodes in a global combining network of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in providing point to point data communications among compute nodes in a global combining network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is useful in a parallel computer capable providing point to point data communications among compute nodes in a global combining network according to embodiments of the present invention. In such a parallel computer according to embodiments of the present invention, each compute node is connected to each adjacent compute node in the global combining network through a network link such as, for example, the bidirectional links to parent node (192) and child nodes (190). The parallel computer operates generally for providing point to point data communications among compute nodes in a global combining network according to embodiments of the present invention by: determining, from among a plurality of class route identifiers for each of the compute nodes along a communications path from an origin compute node to a target compute node in the network, a class route identifier available for all of the compute nodes along the communications path; configuring network hardware (200) of each compute node along the communications path with routing instructions in dependence upon the available class route identifier and a network topology for the network (106), the routing instructions for each compute node associating the available class route identifier with the network links between that compute node and each compute node adjacent to that compute node along the communications path; transmitting, by the origin compute node along the communications path, a network packet to the target compute node, including encoding the available class route identifier in a network packet; and routing, by the network hardware of each compute node along the communications path, the network packet to the target compute node in dependence upon the routing instructions for the network hardware (200) of each compute node and the available class route identifier encoded in the network packet.

Figure 3A:
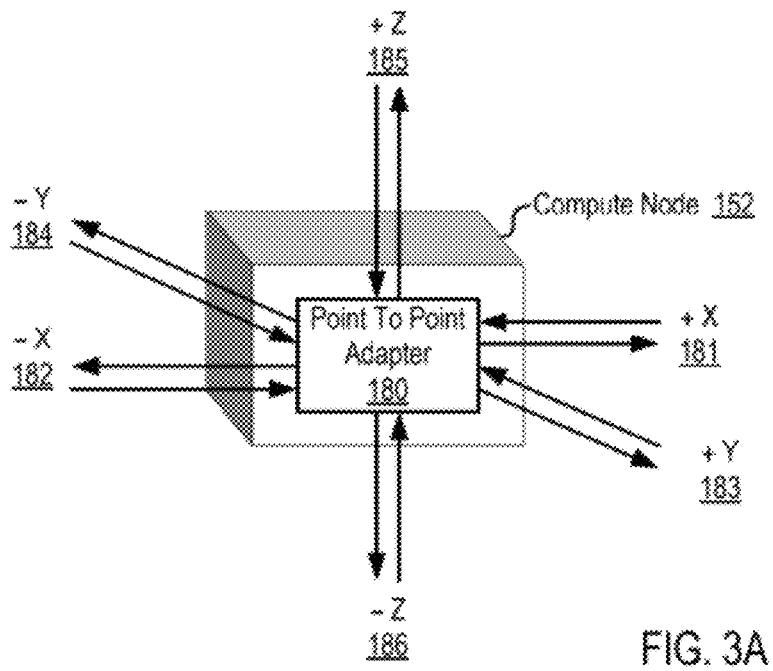
FIG. 3A illustrates an exemplary Point To Point Adapter useful in a parallel computer capable of providing point to point data communications among compute nodes in a global combining network according to embodiments of the present invention.

For further explanation, FIG. 3A illustrates an exemplary Point To Point Adapter (180) useful in a parallel computer capable of providing point to point data communications among compute nodes in a global combining network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
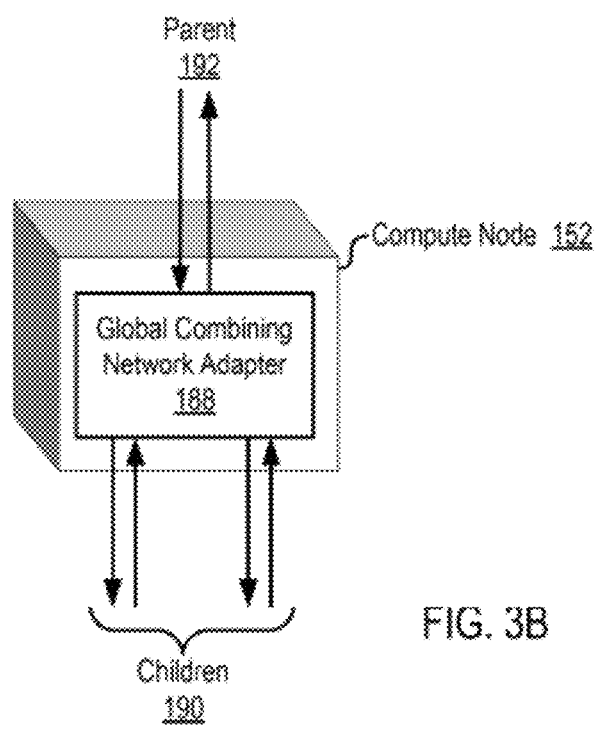
FIG. 3B illustrates an exemplary Global Combining Network Adapter useful in a parallel computer capable of providing point to point data communications among compute nodes in a global combining network according to embodiments of the present invention.

For further explanation, FIG. 3B illustrates an exemplary Global Combining Network Adapter (188) useful in a parallel computer capable of providing point to point data communications among compute nodes in a global combining network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
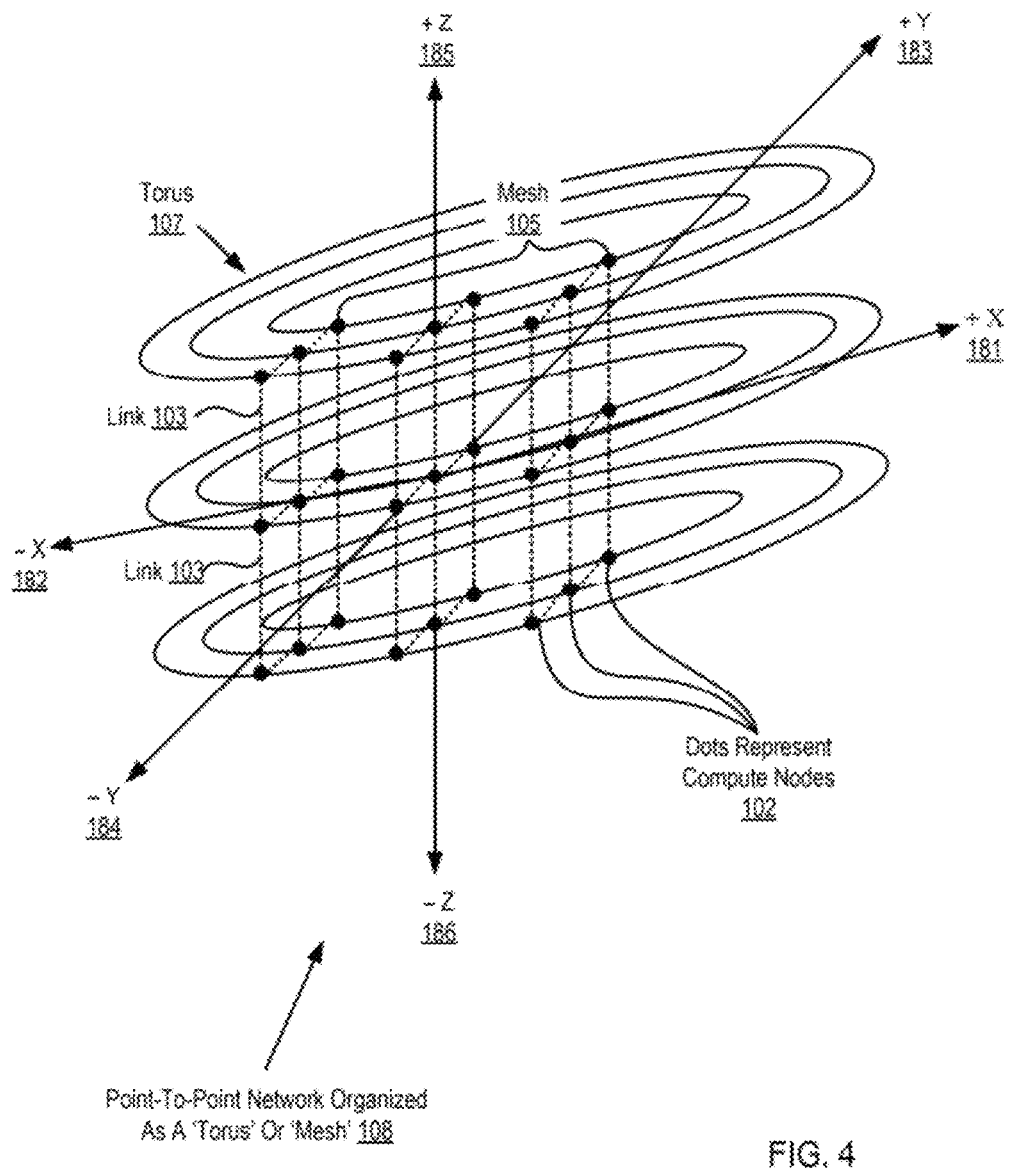
FIG. 4 sets forth a line drawing illustrating an exemplary data communications network optimized for point to point operations useful in a parallel computer capable of providing point to point data communications among compute nodes in a global combining network according to embodiments of the present invention.

For further explanation, FIG. 4 sets forth a line drawing illustrating an exemplary data communications network (108) optimized for point to point operations useful in a parallel computer capable of providing point to point data communications among compute nodes in a global combining network in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in providing point to point data communications among compute nodes in a global combining network of a parallel computer in accordance with embodiments of the present invention may contain only a few compute nodes or may contain thousands of compute nodes.

Figure 5:
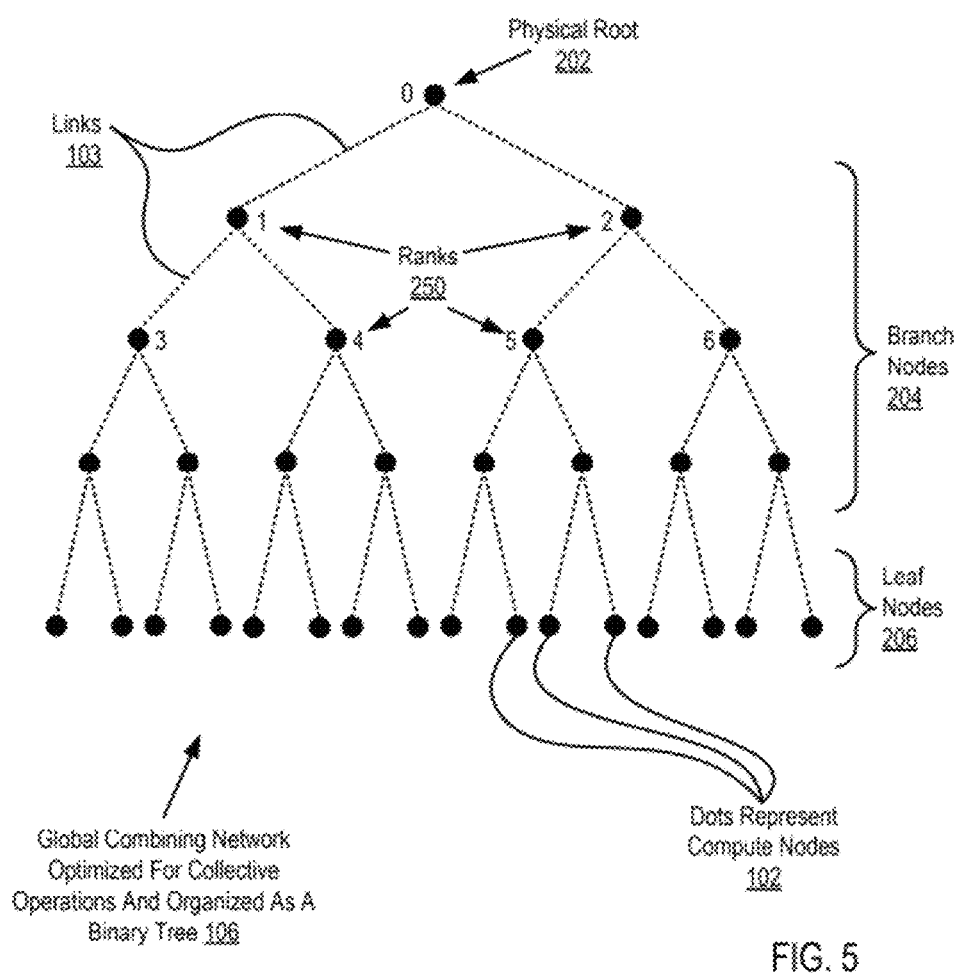
FIG. 5 sets forth a line drawing illustrating an exemplary data communications network optimized for collective operations useful in a parallel computer capable of providing point to point data communications among compute nodes in a global combining network according to embodiments of the present invention.

For further explanation, FIG. 5 sets forth a line drawing illustrating an exemplary data communications network (106) optimized for collective operations useful in a parallel computer capable of providing point to point data communications among compute nodes in a global combining network in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for providing nearest neighbor point-to-point communications among compute nodes of an operational group in a global combining network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
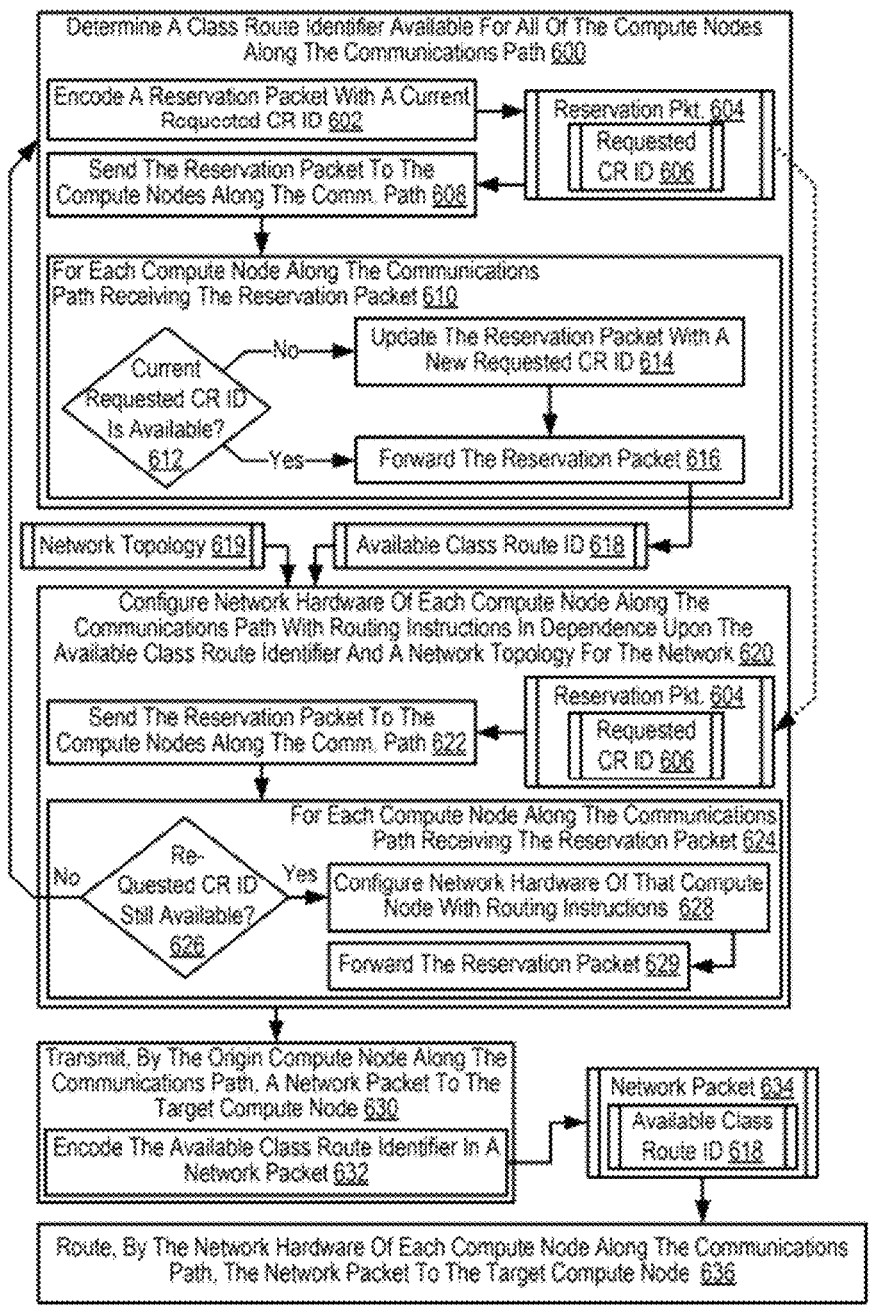
FIG. 6 sets forth a flow chart illustrating an exemplary method for providing point to point data communications among compute nodes in a global combining network of a parallel computer according to embodiments the present invention.

For further explanation, FIG. 6 sets forth a flow chart illustrating an exemplary method for providing point to point data communications among compute nodes in a global combining network of a parallel computer according to embodiments the present invention. Each compute node described with reference to FIG. 6 is connected to each adjacent compute node in the global combining network through a network link.

The method of FIG. 6 includes determining (600), from among a plurality of class route identifiers for each of the compute nodes along a communications path from an origin compute node to a target compute node in the network, a class route identifier (618) available for all of the compute nodes along the communications path. Determining (600) a class route identifier (618) available for all of the compute nodes along the communications path according to the method of FIG. 6 includes encoding (602), by the origin compute node, a reservation packet (604) with a current requested class route identifier (606) and sending (608), by the origin compute node, the reservation packet (604) to the compute nodes along the communications path. The origin compute node may encode (602) the reservation packet (604) with the current requested class route identifier (606) according to the method of FIG. 6 by selecting the lowest numbered class route identifier not actively being used by the origin compute node. The origin compute node may identify the lowest numbered class route identifier not actively being used by the origin compute node using a class route availability table. The class route availability table is a data structure maintained by each compute node that specifies whether each class route identifier for a compute node is currently inactive and available for use by the compute node.

Determining (600) a class route identifier (618) available for all of the compute nodes along the communications path according to the method of FIG. 6 also includes for (610) each compute node along the communications path receiving the reservation packet (604):

determining (612) whether the current requested class route identifier (606) is available for that compute node;

updating (614) the reservation packet (604) with a new requested class route identifier (606) if the current requested class route identifier (606) is not available for that compute node; and forwarding (616) the reservation packet (604) to the remaining compute nodes along the communications path.

Each compute node along the communications path may determine (612) whether the current requested class route identifier (606) is available for that compute node according to the method of FIG. 6 by looking up the availability of the current requested class route identifier (606) in the class route availability table for that compute node. If the class route availability table indicates that the current requested class route identifier (606) is currently inactive, then the current requested class route identifier (606) is available for that compute node. If the class route availability table indicates that the current requested class route identifier (606) is not currently inactive, then the current requested class route identifier (606) is not available for that compute node.

If the current requested class route identifier (606) is not available for one of the compute nodes along the communications path, that compute node may update (614) the reservation packet (604) with a new requested class route identifier (606) according to the method of FIG. 6 by selecting the next higher numbered class route identifier that is available for that compute node and replacing the current value for the requested class route identifier (606) with a value for the next highest numbered class route identifier that is available. Each compute node may then forward (616) the reservation packet (604) to the remaining compute nodes along the communications path according to the method of FIG. 6 until the reservation packet reaches the target compute node.

From the description above, readers will note that each compute node must have some mechanism in place that allows the compute nodes along the communications path to update and forward the reservation packet to one another. The mechanism used by each compute node along the communications path may be implemented as a forwarding table. For further explanation of how the compute nodes may generate forwarding tables, FIG. 7A sets forth a line drawing illustrating an exemplary global combining network useful in a parallel computer capable of providing point to point data communications among compute nodes in the global combining network according to embodiments the present invention. The global combining network (106) organizes the compute nodes in a tree topology.

Figures 7A, 7B:
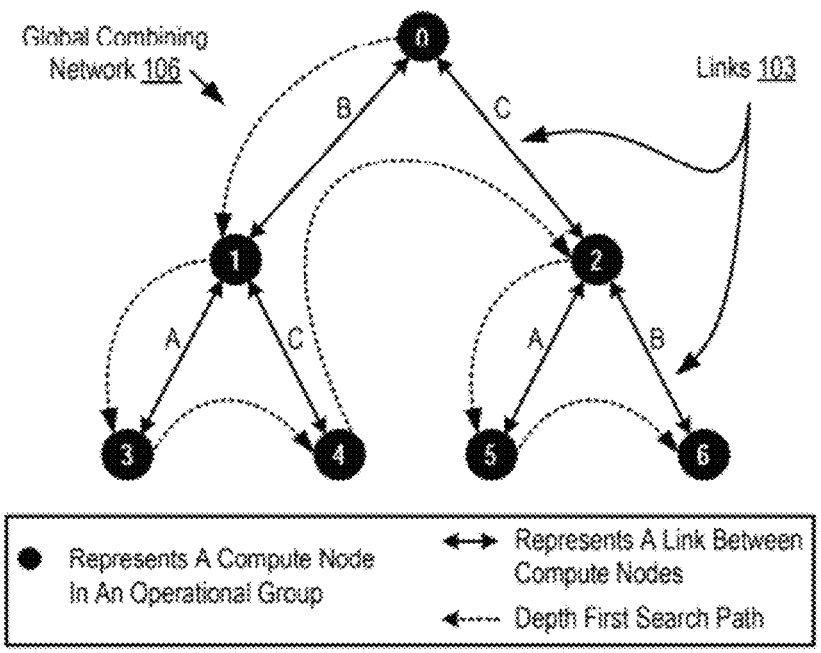
FIG. 7A sets forth a line drawing illustrating an exemplary global combining network useful in a parallel computer capable of providing point to point data communications among compute nodes in the global combining network according to embodiments the present invention.
FIG. 7B sets forth a line drawing illustrating an exemplary forwarding table useful in a parallel computer capable of providing point to point data communications among compute nodes in a global combining network according to embodiments the present invention.

The global combining network (106) in the example of FIG. 7A connects the compute nodes '0,' '1,' '2,' '3,' '4,' '5,' and '6' together for data communications. Each child node in the tree network (106) is connected to its parent node through a link (103) that provides bi-directional data communications. In the example of FIG. 7A, compute node '0' connects to compute node '1' through a link identified on each node as link 'B.' Compute node '1' connects to compute node '3' through a link identified on each node as link 'A.' Compute node '1' connects to compute node '4' through a link identified on each node as link 'C.' Compute node '0' connects to compute node '2' through a link identified on each node as link 'C.' Compute node '2' connects to compute node '5' through a link identified on each node as link 'A.' Compute node '2' connects to compute node '6' through a link identified on each node as link 'B.'

In the example of FIG. 7A, the parallel computer determines a network topology for the compute nodes in the global combining network (106). The network topology specifies arrangement of the compute nodes in the network (106) and the links (103) in the network (106) used to connect the compute nodes. The parallel computer may determine the network topology for the compute nodes of the operational group in the global combining network (106) using a depth first search. A depth first search is an algorithm for traversing a tree structure that explores as far as possible along a branch of the tree until a node with no children is identified and then backtracks, returning to the most recently traversed node having another unexplored branch. Consider, for example, the global combining network (106) in the example of FIG. 7A in which the parallel computer performs a depth first search through the global combining network (106) starting with the compute node '0.' In such an example, the parallel computer traverses from compute node '0' to compute node '1' and then to compute node '3.' Upon reaching compute node '3,' the parallel computer backtracks to compute node '1' and traverses to compute node '4.' Upon reaching compute node '4,' the parallel computer backtracks to compute node '0' and traverses to compute node '2.' The parallel computer then traverses to compute node '5.' Upon reaching compute node '5,' the parallel computer backtracks to compute node '2' and traverses to compute node '6.'

After determining a network topology for the compute nodes of the operational group in the global combining network (106), the parallel computer may creates a forwarding table that associates one of the links for the compute node along which to forward network packets to each of the other compute nodes in the operational group using the network topology. Each compute node may use its forwarding table to select one of the links for the compute node along which to forward the network packet toward its destination compute node.

For further explanation of a forwarding table, FIG. 7B sets forth a line drawing illustrating an exemplary forwarding table useful in a parallel computer capable of providing point to point data communications among compute nodes in a global combining network according to embodiments of the present invention. The parallel computer creates the exemplary forwarding table in FIG. 7B for compute node '1' in the example of FIG. 7A in dependence upon the network topology for the global combining network of FIG. 7A. The exemplary forwarding table of FIG. 7B associates one of the links for compute node '1' along which to forward network packets to each of the other compute nodes in the network. The exemplary forwarding table for compute node '1' associates a destination node identifier of '0' with link identifier 'B,' which specifies forwarding network packets destined for compute node '0' along link 'B' of compute node '1.' The exemplary forwarding table for compute node '1' associates a destination node identifier of '2' with link identifier 'B,' which specifies forwarding network packets destined for compute node '2' along link 'B' of compute node '1.' The exemplary forwarding table for compute node '1' associates a destination node identifier of '3' with link identifier 'A,' which specifies forwarding network packets destined for compute node '3' along link 'A' of compute node '1.' The exemplary forwarding table for compute node '1' associates a destination node identifier of '4' with link identifier 'C,' which specifies forwarding network packets destined for compute node '4' along link 'C' of compute node '1.' The exemplary forwarding table for compute node '1' associates a destination node identifier of '5' with link identifier 'B,' which specifies forwarding network packets destined for compute node '5' along link 'B' of compute node '1.' The exemplary forwarding table for compute node '1' associates a destination node identifier of '6' with link identifier 'B,' which specifies forwarding network packets destined for compute node '6' along link 'B' of compute node '1.'

Readers will recall from the discussion above with reference to FIG. 6 that each compute node along the communications path receiving the reservation packet (604) may determine (612) whether the current requested class route identifier (606) is available for that compute node using a class route availability table. For further explanation, therefore, FIG. 8 sets forth a line drawing illustrating exemplary class route availability tables useful in a parallel computer capable of providing point to point data communications among compute nodes in a global combining network according to embodiments the present invention. The global combining network (106) in the example of FIG. 8 connects the compute nodes '0,' '1,' '2,' '3,' '4,' '5,' and '6' together for data communications in a tree topology. Each child node in the tree network (106) is connected to its parent node through a link illustrated in FIG. 8 as a double ended arrow. Each link provides bi-directional data communications.

Figure 8:
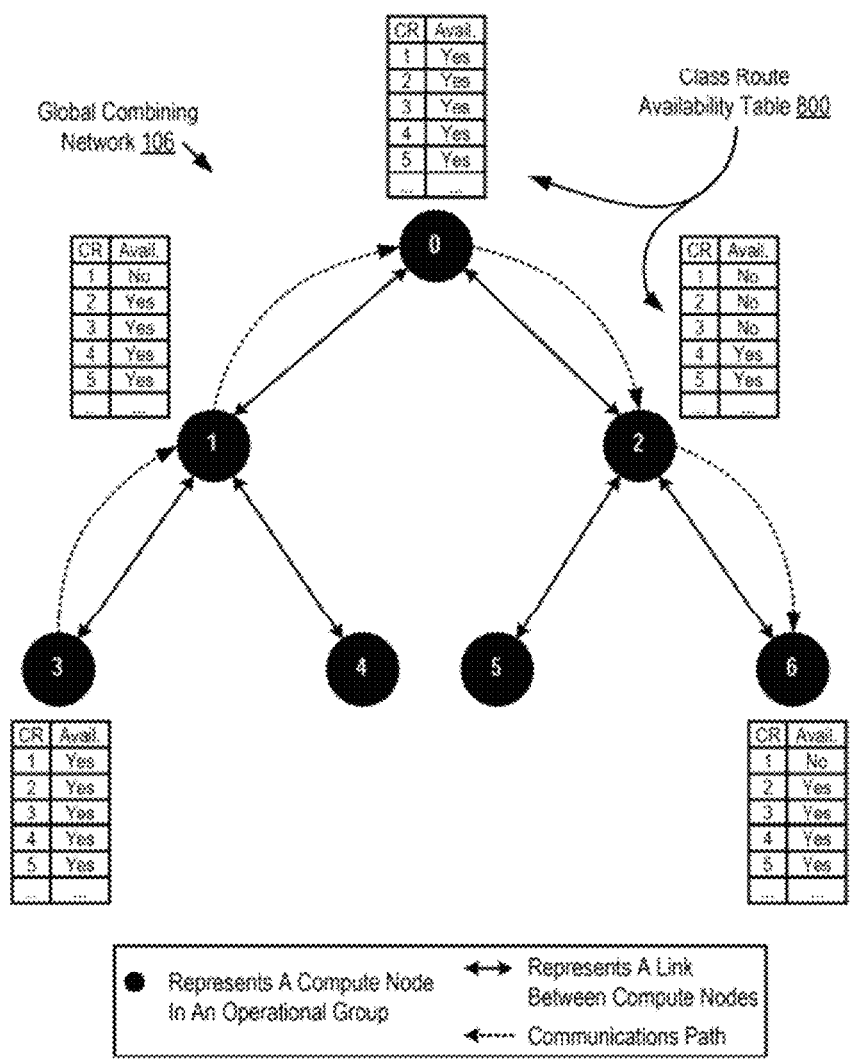
FIG. 8 sets forth a line drawing illustrating exemplary class route availability tables useful in a parallel computer capable of providing point to point data communications among compute nodes in a global combining network according to embodiments the present invention.

Each compute node includes a class route availability table (800). Each class route availability table (800) specifies whether each class route identifier for a compute node is currently inactive and available for use by the compute node. As each compute node along the communications path receives the reservation packet from the origin compute node, each compute node may use its class route availability table (800) to determine whether the current requested class route identifier is available for that compute node. For example, consider FIG. 8 in which compute node 3 is the origin compute node, compute node 6 is the target compute node, and the dotted arrow represents the data communications path between the origin compute node and target compute node. In the example of FIG. 8, the class route availability table (800) for node 3 indicates that all of the class route identifiers are available for use by node 3. Node 3 may therefore encode the lowest available class route, class route identifier 1, in a reservation packet as the requested class route identifier and forward the reservation packet to node 1. Upon receiving the reservation packet, node 1 uses its class route availability table to determine that the requested class route identifier 1 is not available. Thus, node 1 updates the reservation packet with a new requested class route identifier—the next higher available class route identifier 2—and forwards the reservation packet to node 0. Upon receiving the reservation packet, node 0 uses its class route availability table to determine that the requested class route identifier 2 is available and forwards the reservation packet along to node 2 without updating the requested class route identifier. Upon receiving the reservation packet, node 2 uses its class route availability table to determine that the requested class route identifier 2 is not available. Thus, node 2 updates the reservation packet with a new requested class route identifier—the next higher available class route identifier 4—and forwards the reservation packet to node 6. Upon receiving the reservation packet, node 6 uses its class route availability table to determine that the requested class route identifier 4 is available. Target node 6 then forwards the reservation packet back to the compute nodes along the communications path to inform those compute node that class route identifier 4 is the class route identifier available for all of the compute node along the communications path.

Turning back to FIG. 6: as the reservation packet travels along the communications path from the target compute node to the origin compute node, each compute node configures that node's network hardware with routing instructions based on the available class route identifier (618). Accordingly, the method of FIG. 6 includes configuring (620) network hardware of each compute node along the communications path with routing instructions in dependence upon the available class route identifier (618) and a network topology (619) for the network. Configuring (620) network hardware of each compute node along the communications path with routing instructions according to the method of FIG. 6 includes sending (622), by the target compute node, the reservation packet (604) to the compute nodes along the communications path. As mentioned above, the routing instructions for each compute node associate the available class route identifier (618) with the network links between that compute node and each compute node adjacent to that compute node along the communications path. The network topology (619) of FIG. 6 represents the arrangement of the compute nodes in the network and the links in the network used to connect the compute nodes.

Configuring (620) network hardware of each compute node along the communications path with routing instructions according to the method of FIG. 6 also includes for (624) each compute node along the communications path receiving the reservation packet (604):

determining (626) whether the requested class route identifier (606) specified in the reservation packet (604) is still available for that compute node;

configuring (628) network hardware of that compute node with routing instructions that associate the requested class route identifier (606) specified in the reservation packet with the network links between that compute node and each compute node adjacent to that compute node along the communications path if the requested class route identifier (606) specified in the reservation packet (604) is still available for that compute node; and forwarding (629) the reservation packet (604) to the remaining compute nodes along the communications path.

Each compute node along the communications path may determine (626) whether the requested class route identifier (606) specified in the reservation packet (604) is still available for that compute node according to the method of FIG. 6 by looking up the availability of the requested class route identifier (606) in the class route availability table for that compute node. If the class route availability table indicates that the current requested class route identifier (606) is currently inactive, then the current requested class route identifier (606) is still available for that compute node. If the class route availability table indicates that the current requested class route identifier (606) is not currently inactive, then the current requested class route identifier (606) is not still available for that compute node. If the current requested class route identifier (606) is not still available for that compute node, then a message is sent to the origin compute node to restart the process of determining (600) a class route identifier that is available for all of the compute nodes along the communications path.

If the current requested class route identifier (606) is still available for the compute nodes along the communications path, then that compute node may configure (628) network hardware of that compute node with routing instructions according to the method of FIG. 6 by inserting values in the routing registers in the router of the compute node's network hardware that give effect to the routing instructions. Each compute node may then forward (629) the reservation packet (604) to the remaining compute nodes along the communications path according to the method of FIG. 6 until the reservation packet reaches the origin compute node.

The method of FIG. 6 includes transmitting (630), by the origin compute node along the communications path, a network packet (634) to the target compute node. The origin compute node transmits (630) the network packet (634) along the communications path to the target compute node according to the method of FIG. 6 by encoding (632) the available class route identifier (618) in a network packet (634). The origin compute node may encode (632) the available class route identifier (618) in a network packet (634) according to the method of FIG. 6 by embedding the available class route identifier (618) in the packet header of the network packet (634).

The method of FIG. 6 includes routing (636), by the network hardware of each compute node along the communications path, the network packet (634) to the target compute node in dependence upon the routing instructions for the network hardware of each compute node and the available class route identifier (618) encoded in the network packet (634). The network hardware for each node routes (636) the network packet (634) to the target compute node according to the method of FIG. 6 by receiving the network packet (634), retrieving the routing instructions associated with the class route identifier (618) specified by the packet (634), forwarding the packets along the network link to the next node along the communications path according to the retrieved routing instructions.

Readers will note that although determining (600) the available class route identifier and configuring (620) network hardware with class routing instructions utilizes processing cores of the intervening compute nodes along the communications path, routing (636) the network packet (634) to the target compute node does not involve the processing cores of those intervening compute nodes to route network packets from the origin node to the target node. The processing cores of the intervening compute nodes are typically involved in determining (600) the available class route identifier and configuring (620) network hardware with class routing instructions in that the processing cores use forwarding tables to identify the network links along which to forward the reservation packet between the origin node and the target node. In addition, the processing cores of the intervening compute nodes also retrieve the available class route identifier from the reservation packet and set values of the routing registers in the network hardware. When the processing cores of the intervening nodes configure (620) network hardware with class routing instructions, however, the routing information required by intervening compute nodes to route network packets between the origin node and the target node in a point to point manner is moved from computer memory—typically accessed through a processing core—to the network hardware itself where the routing information is utilized by the network hardware to provide routing functionality without involving the processing core. Thus, once the network hardware is configured with the routing instructions, point to point data communications between the origin compute node and the target compute node according to embodiments of the present invention may occur without involving the processing cores of any intervening compute nodes to route network packets along the data communications path, thereby decreasing overall transmission latency.

Figure 9A:
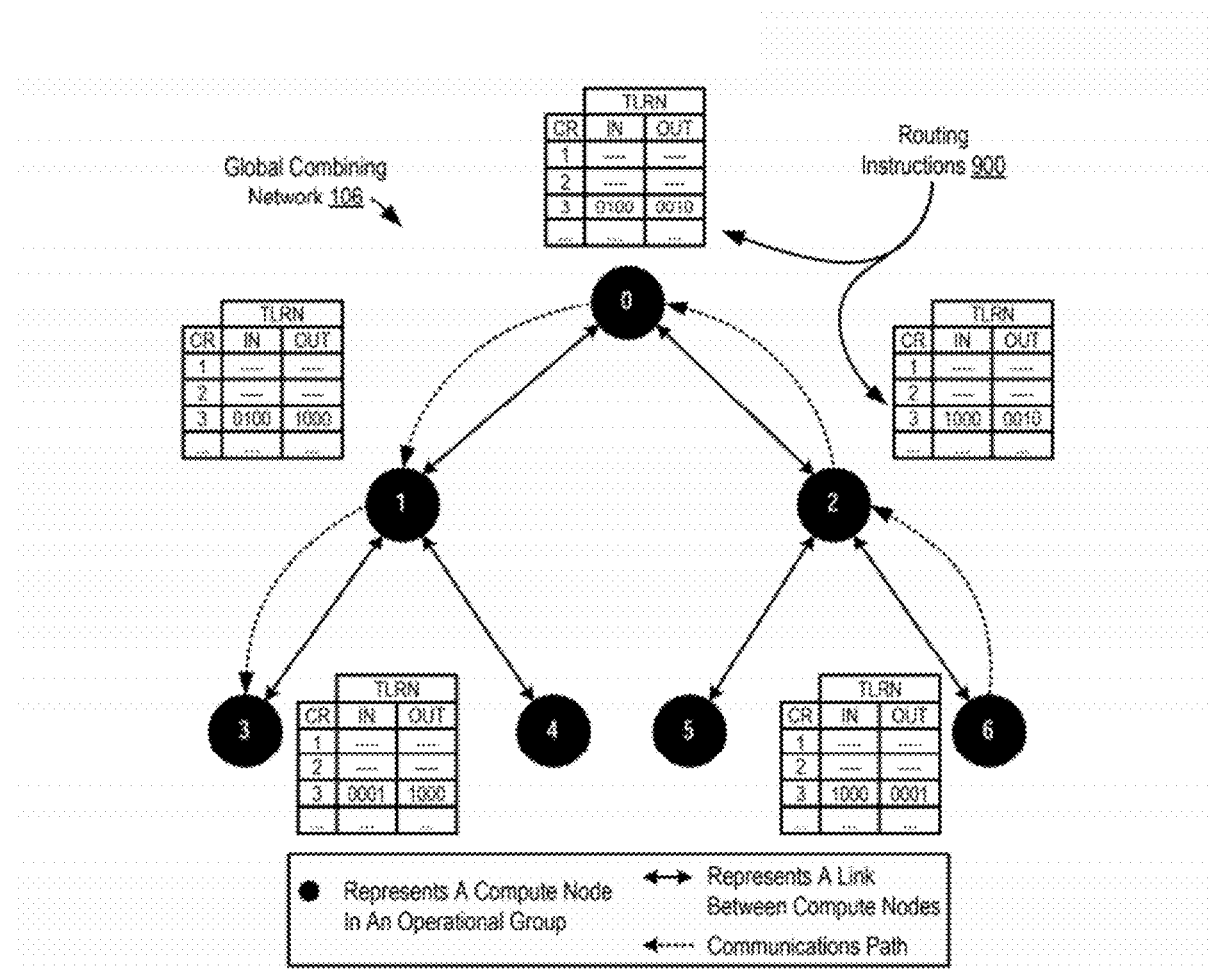
FIG. 9A sets forth a line drawing illustrating exemplary routing instructions useful in a parallel computer capable of providing point to point data communications among compute nodes in a global combining network according to embodiments the present invention.

Turning now to illustrate an exemplary manner in which a parallel computer may configure network hardware of each compute node along the communications path with routing instructions, FIG. 9A sets forth a line drawing illustrating exemplary routing instructions useful in a parallel computer capable of providing point to point data communications among compute nodes in a global combining network according to embodiments the present invention. FIG. 9A illustrates an exemplary global combining network (106) that includes compute nodes '0,' '1,' '2,' '3,' '4,' '5,' and '6'. Each compute node is connected with each of its respective adjacent compute nodes in the global combining network (106) using a bi-directional link illustrated as a solid double-ended arrow.

For further explanation of the routing instructions, consider that compute node 3 is an origin compute node, compute node 6 is a target compute node, and the data communications path between the target compute node and the origin compute node is represented using a dotted single-ended arrow. Further consider that class route identifier 3 is the class route identifier available for each of the compute nodes along the communications path. In the example of FIG. 9A, the parallel computer configures the network hardware of each compute node along the communications path with routing instructions (900) that associate the available class route identifier 3 with the network links between that compute node and each compute node adjacent to that compute node along the communications path. The parallel computer may configure the network hardware of each compute node along the communications path with routing instructions (900) by inserting values in the routing registers in the router of the compute node's network hardware that give effect to the routing instructions. FIG. 9A illustrates routing instructions (900) associated with the available class route identifier 3 and used to provide point to point data communications between origin node 3 and target node 6.

Figure 9B:
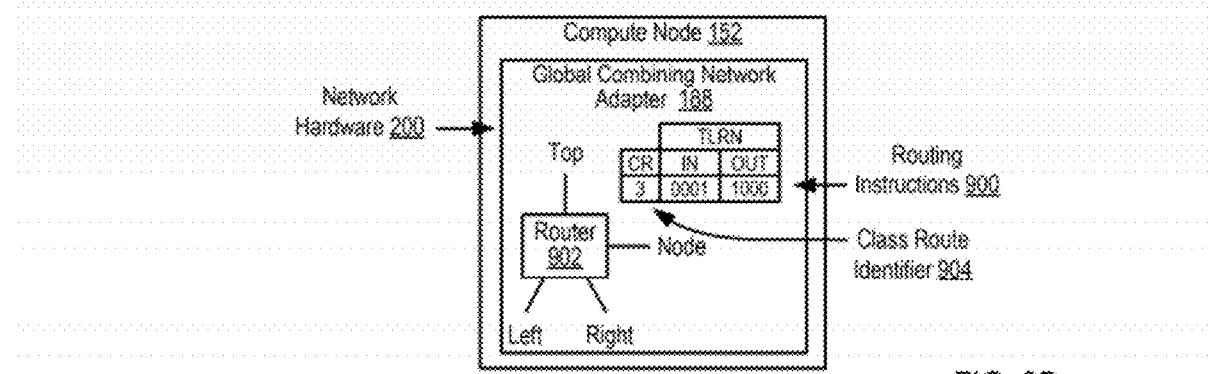
FIG. 9B sets forth a line drawing illustrating exemplary network hardware configured with routing instructions useful in a parallel computer capable of providing point to point data communications among compute nodes in a global combining network according to embodiments the present invention.

To aid readers in understanding how routing instructions configured in routing registers of compute node network hardware provide point to point data communications among compute nodes in a global combining network of a parallel computer according to embodiments of the present invention, consider FIG. 9B. FIG. 9B sets forth a line drawing illustrating exemplary network hardware configured with routing instructions useful in a parallel computer capable of providing point to point data communications among compute nodes in a global combining network according to embodiments the present invention.

The compute node (152) of FIG. 9B includes network hardware (200) in the form of a global combining network adapter (188) as described above. The network adapter (188) includes a router (902). The router (902) has a link labeled 'Top' that links the compute node (152) to its parent in a global combining network. The router (902) has a link labeled 'Left' that links the compute node (152) to its child node along the left branch in the global combining tree. The router (902) has a link labeled 'Right' that links the compute node (152) to its child node along the right branch in the global combining tree. The router (902) also has a link labeled 'Node' that links the router to the other components (not shown) of the compute node (152) such as for example, a DMA controller, an expansion bus, a processing core, volatile memory, and so on. Through the 'Node' link, the other components of the compute node (152) receive and inject packets onto the global combining network.

The global combining network adapter (188) includes two routing registers for each class route identifier (904), one register labeled 'IN' and the other register labeled 'OUT.' Each register is four bits in size such that each bit in each register corresponds to one of the links labeled 'Top,' 'Left,' 'Right,' or 'Node.' In the example of FIG. 9B, the first bit of each register corresponds to the link labeled 'Top.' The second bit of each register corresponds to the link labeled 'Left.' The third bit of each register corresponds to the link labeled 'Right.' The fourth bit of each register corresponds to the link labeled 'Node.'

The network adapter (188) of FIG. 9B includes a router (902) that receives packets to be routed on a global combining network that connects the compute node (152) to other compute nodes. When the router (902) of FIG. 9B receives a packet on a link, the router (902) applies a routing algorithm to determine the links along which the router (902) should forward the packet. The routing algorithm used by the router (902) in the example of FIG. 9B utilizes the routing instructions stored in the routing registers (704) of the network adapter (188). The routing algorithm operates generally as follows:

the router (902) identifies the link on which the router (902) received a packet for routing, the router (902) looks up the value for the bit in the 'IN' register that corresponds to the link on which the router received the packet, if the bit value is zero, then the router (902) forwards the packet on the links which correspond to the bits in the 'IN' register for which the bit value is one, and if the bit value is one, then the router (902) forwards the packet on the links which correspond to the bits in the 'OUT' register for which the bit value is one.

Using the routing algorithm described above, the exemplary routing instructions configured in the routing registers of FIG. 9B specify forwarding a packet along the link labeled 'Node' if the packet is received on any of the links labeled 'Top,' 'Left,' or 'Right.' If the packet is received on the link labeled 'Node,' the exemplary routing instructions configured in the routing register of FIG. 9B specify forwarding the packet along the link labeled 'Top' to the parent node. Readers will note that the exemplary routing instructions (900) and exemplary class route identifier (904) in FIG. 9B are for explanation only and not for limitation. Other routing instructions, class route identifiers, and implementations thereof may be useful in providing point to point data communications among compute nodes in a global combining network of a parallel computer according to embodiments of the present invention.

The explanation above with reference to FIG. 6 describes an exemplary embodiment of providing point to point data communications among compute nodes in a global combining network of a parallel computer in which the compute nodes already have a point to point protocol in place for sending the initial reservation packet to determine the class route available for each of the compute nodes along the communications path. The point to point protocol in place for sending the initial reservation packet invokes the processing cores of each of the intervening compute nodes to route the reservation packet between the origin compute node and the target compute node. The processing cores of these intervening nodes then use the available class route identifier in the reservation packet to configure routing instructions in the network hardware of the intervening compute nodes. In such a manner, the information required by an intervening compute node to route network packets from the origin node to the target node in a point to point manner is moved from computer memory typically accessed through a processing core to the network hardware where the information is utilized to provide routing functionality without involving the processing core. In some embodiments, however, the point to point protocol for sending the initial reservation packet is not already in place. Thus, the compute nodes along the communications path cannot use a reservation packet to inform each other of the available class routing identifier. In such embodiments, a reduction operation may be performed to obtain the class route identifier that is available for all of the compute nodes along the communications path between an origin node and a target node. For further explanation, FIG. 10 sets forth a flow chart illustrating a further exemplary method for providing point to point data communications among compute nodes in a global combining network of a parallel computer according to embodiments the present invention.

Figure 10:
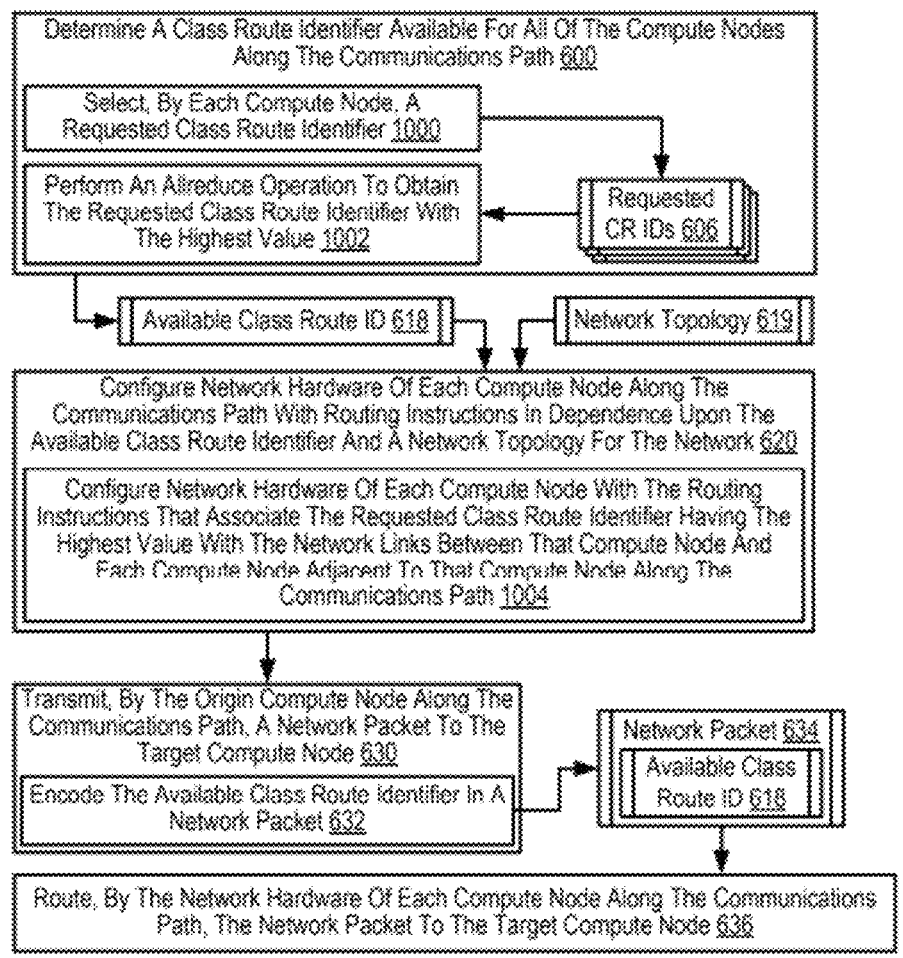
FIG. 10 sets forth a flow chart illustrating a further exemplary method for providing point to point data communications among compute nodes in a global combining network of a parallel computer according to embodiments the present invention.

The method of FIG. 10 is similar to the method of FIG. 6. That is, the method of FIG. 10 includes: determining (600), from among a plurality of class route identifiers for each of the compute nodes along a communications path from an origin compute node to a target compute node in the network, a class route identifier (618) available for all of the compute nodes along the communications path; configuring (620) network hardware of each compute node along the communications path with routing instructions in dependence upon the available class route identifier (618) and a network topology (619) for the network, the routing instructions for each compute node associating the available class route identifier (618) with the network links between that compute node and each compute node adjacent to that compute node along the communications path; transmitting (630), by the origin compute node along the communications path, a network packet (634) to the target compute node, including encoding (632) the available class route identifier in the network packet (634); and routing (636), by the network hardware of each compute node along the communications path, the network packet (634) to the target compute node in dependence upon the routing instructions for the network hardware of each compute node and the available class route identifier (618) encoded in the network packet (634).

In the method of FIG. 10, however, determining (600) a class route identifier (618) available for all of the compute nodes along the communications path includes selecting (1000), by each compute node, a requested class route identifier (606) and performing (1002) an allreduce operation to obtain the requested class route identifier (606) having the highest value. Each compute node may select (1000) a requested class route identifier (606) according to the method of FIG. 10 by identifying the lowest numbered class route identifier for that compute node using a class route availability table for that compute node. The parallel computer may perform (1002) the allreduce operation using the origin compute node as the logical root and only including the compute nodes along the communications path in the allreduce operation. The network topology (619) of FIG. 10 specifies the compute nodes along the communications path. The origin compute node then identifies the requested class route identifier (606) having the highest value as the available class route identifier (618).

In the method of FIG. 10, configuring (620) network hardware of each compute node along the communications path with routing instructions includes configuring (1004) network hardware of each compute node with the routing instructions that associate the requested class route identifier (618) having the highest value with the network links between that compute node and each compute node adjacent to that compute node along the communications path. Each compute node may configure (1004) network hardware of each compute node with the routing instructions according to the method of FIG. 10 by inserting values in the routing registers of the compute node's network hardware that give effect to the routing instructions. The manner in which values inserted into the routing registers of each compute node's network hardware implement the routing instructions is described above with reference to FIGS. 9A and 9B.

Exemplary embodiments of the present invention are described largely in the context of a fully functional parallel computer system for providing point to point data communications among compute nodes in a global combining network of a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing point to point data communications among compute nodes in a global combining network of a parallel computer, each compute node connected to each adjacent compute node in the global combining network through a network link, the method comprising:

determining, from among a plurality of class route identifiers for each of the compute nodes along a communications path from an origin compute node to a target compute node in the network, a single class route identifier that is available for each of the compute nodes along the communications path, the class route identifier specifying the route between multiple nodes;

configuring network hardware of each compute node along the communications path with routing instructions in dependence upon the available class route identifier and a network topology for the network, the routing instructions for each compute node associating the available class route identifier with the network links between that compute node and each compute node adjacent to that compute node along the communications path;

transmitting, by the origin compute node along the communications path, a network packet to the target compute node, including encoding the available class route identifier in the network packet; and routing, by the network hardware of each compute node along the communications path, the network packet to the target compute node in dependence upon the routing instructions for the network hardware of each compute node and the available class route identifier encoded in the network packet.

2. The method of claim 1 wherein determining, from among a plurality of class route identifiers for each of the compute nodes along a communications path from an origin compute node to a target compute node in the network, a single class route identifier that is available for each of the compute nodes along the communications path further comprises:
- encoding, by the origin compute node, a reservation packet with a current requested class route identifier;
- sending, by the origin compute node, the reservation packet to the compute nodes along the communications path; and
- for each compute node along the communications path receiving the reservation packet: determining whether the current requested class route identifier is available for that compute node; updating the reservation packet with a new requested class route identifier if the current requested class route identifier is not available for that compute node; and forwarding the reservation packet to the remaining compute nodes along the communications path.

3. The method of claim 2 wherein configuring network hardware of each compute node along the communications path with routing instructions in dependence upon the available class route identifier and a network topology for the network further comprises:
- sending, by the target compute node, the reservation packet to the compute nodes along the communications path; and
- for each compute node along the communications path receiving the reservation packet: determining whether the requested class route identifier specified in the reservation packet is still available for that compute node; and configuring network hardware of that compute node with routing instructions that associate the requested class route identifier specified in the reservation packet with the network links between that compute node and each compute node adjacent to that compute node along the communications path.

4. The method of claim 1 wherein determining, from among a plurality of class route identifiers for each of the compute nodes along a communications path from an origin compute node to a target compute node in the network, a single class route identifier that is available for each of the compute nodes along the communications path further comprises:
- selecting, by each compute node, a requested class route identifier; and
- performing an allreduce operation to obtain the requested class route identifier having the highest value.

5. The method of claim 4 wherein configuring network hardware of each compute node along the communications path with routing instructions in dependence upon the available class route identifier and a network topology for the network further comprises configuring network hardware of each compute node with the routing instructions that associate the requested class route identifier having the highest value with the network links between that compute node and each compute node adjacent to that compute node along the communications path.

6. The method of claim 1 wherein the compute nodes are connected together using a plurality of data communications networks, at least one of the communications networks optimized for point to point operations, and at least one of the communications networks optimized for collective operations.

7. A parallel computer for providing point to point data communications among compute nodes in a global combining network of the parallel computer, each compute node connected to each adjacent compute node in the global combining network through a network link, the parallel computer comprising a plurality of computer processors and computer memory operatively coupled to the computer processors, the computer memory having disposed within it computer program instructions capable of:
- determining, from among a plurality of class route identifiers for each of the compute nodes along a communications path from an origin compute node to a target compute node in the network, a single class route identifier that is available for each of the compute nodes along the communications path, the class route identifier specifying the route between multiple nodes;
- configuring network hardware of each compute node along the communications path with routing instructions in dependence upon the available class route identifier and a network topology for the network, the routing instructions for each compute node associating the available class route identifier with the network links between that compute node and each compute node adjacent to that compute node along the communications path;
- transmitting, by the origin compute node along the communications path, a network packet to the target compute node, including encoding the available class route identifier in the network packet; and
- routing, by the network hardware of each compute node along the communications path, the network packet to the target compute node in dependence upon the routing instructions for the network hardware of each compute node and the available class route identifier encoded in the network packet.

8. The parallel computer of claim 7 wherein determining, from among a plurality of class route identifiers for each of the compute nodes along a communications path from an origin compute node to a target compute node in the network, a single class route identifier that is available for each of the compute nodes along the communications path further comprises:
- encoding, by the origin compute node, a reservation packet with a current requested class route identifier;
- sending, by the origin compute node, the reservation packet to the compute nodes along the communications path; and
- for each compute node along the communications path receiving the reservation packet: determining whether the current requested class route identifier is available for that compute node; updating the reservation packet with a new requested class route identifier if the current requested class route identifier is not available for that compute node; and forwarding the reservation packet to the remaining compute nodes along the communications path.

9. The parallel computer of claim 8 wherein configuring network hardware of each compute node along the communications path with routing instructions in dependence upon the available class route identifier and a network topology for the network further comprises:
- sending, by the target compute node, the reservation packet to the compute nodes along the communications path; and for each compute node along the communications path receiving the reservation packet: determining whether the requested class route identifier specified in the reservation packet is still available for that compute node; and configuring network hardware of that compute node with routing instructions that associate the requested class route identifier specified in the reservation packet with the network links between that compute node and each compute node adjacent to that compute node along the communications path.

10. The parallel computer of claim 7 wherein determining, from among a plurality of class route identifiers for each of the compute nodes along a communications path from an origin compute node to a target compute node in the network, a single class route identifier that is available for each of the compute nodes along the communications path further comprises:

selecting, by each compute node, a requested class route identifier; and performing an allreduce operation to obtain the requested class route identifier having the highest value.

11. The parallel computer of claim 10 wherein configuring network hardware of each compute node along the communications path with routing instructions in dependence upon the available class route identifier and a network topology for the network further comprises configuring network hardware of each compute node with the routing instructions that associate the requested class route identifier having the highest value with the network links between that compute node and each compute node adjacent to that compute node along the communications path.

12. The parallel computer of claim 7 wherein the compute nodes are connected together using a plurality of data communications networks, at least one of the communications networks optimized for point to point operations, and at least one of the communications networks optimized for collective operations.

13. A computer program product for providing point to point data communications among compute nodes in a global combining network of a parallel computer, each compute node connected to each adjacent compute node in the global combining network through a network link, the computer program product disposed upon a computer readable recordable medium, the computer program product comprising computer program instructions capable of:

determining, from among a plurality of class route identifiers for each of the compute nodes along a communications path from an origin compute node to a target compute node in the network, a single class route identifier that is available for each of the compute nodes along the communications path, the class route identifier specifying the route between multiple nodes;

configuring network hardware of each compute node along the communications path with routing instructions in dependence upon the available class route identifier and a network topology for the network, the routing instructions for each compute node associating the available class route identifier with the network links between that compute node and each compute node adjacent to that compute node along the communications path;

transmitting, by the origin compute node along the communications path, a network packet to the target compute node, including encoding the available class route identifier in the network packet; and routing, by the network hardware of each compute node along the communications path, the network packet to the target compute node in dependence upon the routing instructions for the network hardware of each compute node and the available class route identifier encoded in the network packet.

14. The computer program product of claim 13 wherein determining, from among a plurality of class route identifiers for each of the compute nodes along a communications path from an origin compute node to a target compute node in the network, a single class route identifier that is available for each of the compute nodes along the communications path further comprises:

encoding, by the origin compute node, a reservation packet with a current requested class route identifier;

sending, by the origin compute node, the reservation packet to the compute nodes along the communications path; and for each compute node along the communications path receiving the reservation packet: determining whether the current requested class route identifier is available for that compute node; updating the reservation packet with a new requested class route identifier if the current requested class route identifier is not available for that compute node; and forwarding the reservation packet to the remaining compute nodes along the communications path.

15. The computer program product of claim 14 wherein configuring network hardware of each compute node along the communications path with routing instructions in dependence upon the available class route identifier and a network topology for the network further comprises:

sending, by the target compute node, the reservation packet to the compute nodes along the communications path; and for each compute node along the communications path receiving the reservation packet: determining whether the requested class route identifier specified in the reservation packet is still available for that compute node; and configuring network hardware of that compute node with routing instructions that associate the requested class route identifier specified in the reservation packet with the network links between that compute node and each compute node adjacent to that compute node along the communications path.

16. The computer program product of claim 13 wherein determining, from among a plurality of class route identifiers for each of the compute nodes along a communications path from an origin compute node to a target compute node in the network, a single class route identifier that is available for each of the compute nodes along the communications path further comprises:

selecting, by each compute node, a requested class route identifier; and performing an allreduce operation to obtain the requested class route identifier having the highest value.

17. The computer program product of claim 16 wherein configuring network hardware of each compute node along the communications path with routing instructions in dependence upon the available class route identifier and a network topology for the network further comprises configuring network hardware of each compute node with the routing instructions that associate the requested class route identifier having the highest value with the network links between that compute node and each compute node adjacent to that compute node along the communications path.

18. The computer program product of claim 13 wherein the compute nodes are connected together using a plurality of data communications networks, at least one of the communications networks optimized for point to point operations, and at least one of the communications networks optimized for collective operations.

* * * * *